United States Patent [19]

Swanson

[11] 4,359,867
[45] Nov. 23, 1982

[54] SEAT ACCUMULATOR CLUTCH BOOSTER ASSIST

[75] Inventor: William C. Swanson, Clarendon Hills, Ill.

[73] Assignee: International Harvester Co., Chicago, Ill.

[21] Appl. No.: 240,039

[22] Filed: Mar. 3, 1981

[51] Int. Cl.³ .............................................. F15B 1/02
[52] U.S. Cl. ....................................... 60/413; 60/404; 267/117
[58] Field of Search ................. 60/403, 404, 405, 413; 267/120, 124, 126, 117; 192/85 R

[56] References Cited

U.S. PATENT DOCUMENTS 2,622,400 12/1952 Greer ................................. 60/413 X
2,934,903 5/1960 Hupp ................................. 60/404 X
3,486,417 12/1969 DiVita ............................. 267/117 X
3,638,528 2/1972 Lewis .................................... 60/413
4,218,882 8/1980 Farr ...................................... 60/413

FOREIGN PATENT DOCUMENTS 1065738 4/1967 United Kingdom .................. 60/404

Primary Examiner—Robert G. Nilson
Attorney, Agent, or Firm—B Parad; F. D. AuBuchon

[57] ABSTRACT

A hydraulically actuated clutch booster utilizes a seat accumulator incorporated in a vehicle seat suspension circuit for a source of fluid pressure when the normal clutch booster fluid supply pump is not operating thereby providing hydraulic assist to operate the vehicle's clutch upon initial start up.

9 Claims, 1 Drawing Figure

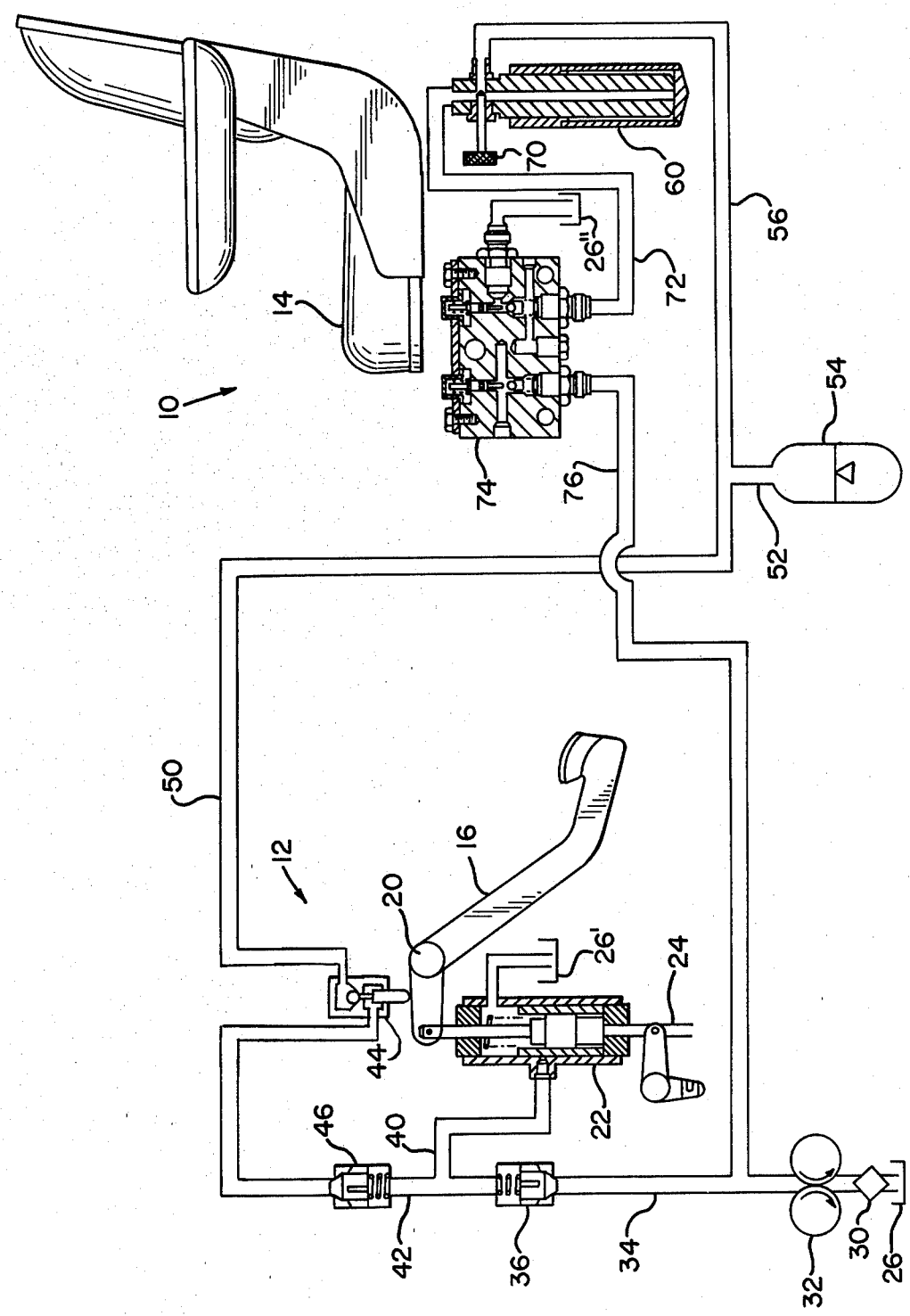

SEAT ACCUMULATOR CLUTCH BOOSTER ASSIST

BACKGROUND OF THE INVENTION

1. Field of the Invention

A motor vehicle clutch assist booster is hydraulically connected with the hydraulic suspension of the vehicle's seat. Specifically, hydraulic pressure is directed to the clutch booster when the normal source of fluid pressure to the clutch booster is below a minimum level. The seat suspension accumulator is the auxiliary source of hydraulic pressure.

2. Description of the Prior Art

It is known to use a clutch booster to assist in the operation of large clutches such as those used on agricultural tractors. With hydraulic assist the disengagement of the vehicle's transmission is much more easily accomplished. A specific type of clutch booster is discussed in U.S. Pat. No. 4,061,079 assigned to the same assignee as is this invention and represents one type of clutch booster that could be used with this invention.

Typical clutch boosters receive hydraulic fluid under pressure from a primary source of fluid pressure that is most often a hydraulic pump. The hydraulic pump would be driven by the vehicle engine when the engine is running or by an engine driven component such as a transmission shaft. In most situations it is necessary to have the host vehicles engine running to generate sufficient hydraulic pressure to operate the hydraulic clutch.

It is also known to provide onboard hydraulic accumulators that will be capable of supplying a minimal quantity of hydraulic fluid under pressure to a vehicle hydraulic system—most typically a vehicle brake system—when there is an engine failure causing an inability of the engine to drive the hydraulic motor.

Some tractor vehicles have been provided with hydraulically suspended seat systems. The hydraulic aspects are directed to the seat elevation control and dampening of undulations of the seat to smooth out the ride experienced by the operator. A hydraulic fluid accumulator is used to provide a dampening chamber to assure that the seat is supplied with fluid necessary for a limited number of adjustments even when the tractor's hydraulic fluid pump is not running.

The Applicant does not know of any hydraulic clutch booster systems that utilize hydraulic fluid stored in a seat accumulator to supply hydraulic fluid under pressure to clutch booster when the engine is not running. The problem of not having a source of hydraulic fluid under pressure to assist in clutch booster operation is acute when starting the tractor. Without the hydraulic assist the operator has to disengage a very strong tractor clutch without the aid of power assist. This is difficult for all operators and this invention will be even more appreciated by the females now operating the modern cab equipped tractors. Since cabs have become more comfortable and convenient more females and adolescents can drive the tractors. The clutch booster assist on start-up will be especially appreciated by these drivers as well as drivers familiar with older equipment.

SUMMARY OF THE INVENTION

A tractor vehicle is provided with a pedal operated clutch incorporating a power assist clutch booster that when supplied with hydraulic fluid will assist in the disengagement of the heavy tractor clutch. The tractor includes a hydraulic seat having an accumulator that will store hydraulic fluid under pressure during time when the tractor vehicle and the hydraulic fluid pump are shut off and not operating. The power assist clutch booster is in hydraulic communication with the accumulator of the tractor seat and will receive fluid under pressure from the seat accumulator when the clutch pedal is depressed and the tractor engine is not running or when the primary source of hydraulic fluid is interrupted.

A pair of check valves are provided in the hydraulic connection between the seat accumulator and clutch booster to prevent the seat accumulator from discharging to the clutch booster when the vehicle engine and the onboard hydraulic fluid pump is providing a source of fluid pressure for the clutch booster.

An advantage of the invention is that the clutch booster is provided with hydraulic fluid under pressure from a seat associated hydraulic accumulator to provide a disengagement assist when the host tractor vehicle is being started.

Another advantage is that redundant sources of hydraulic fluid are not provided when the normal hydraulic pump is not operating.

Also an advantage is that the hydraulic accumulator is recharged by the tractor hydraulic system regardless of clutch operation once the vehicle hydraulic pump is operating.

These and other advantages of this invention will be apparent from a perusal of the following detailed description when read in light of the drawing FIGURE.

DETAILED DESCRIPTION OF THE INVENTION

The single drawing FIGURE shows the operator's location of an agricultural vehicle generally 10 and the clutch booster area of the same vehicle generally 12 which is the environment of the invention. The host tractor would be a contemporary farm or industrial tractor.

The seat 14 is positioned so that the operator can depress the clutch pedal 16 from the seat. The clutch pedal is pivotally mounted at suspension point 20 and incorporates a linkage connecting it to a clutch booster 22 having an output linkage 24. The clutch booster is a hydraulic motor device that will accentuate and multiply the input force on the pedal 16 such that the output force through linkage 24 is much greater than the input force. Of course the source of hydraulic fluid under pressure must supply the hydraulic clutch booster.

The primary source of hydraulic fluid is the pump 32 which draws fluid from a reservoir 26 through a filter 30. When the engine of the host vehicle is running the pump 32 will provide fluid under pressure to first supply conduit 34 as well as to second supply conduit 76. First supply conduit 34 leads to a first check valve 36 that allows fluid flow only from first supply conduit 34 to first and second clutch booster supply conduits 40 and 42 respectively thence to the clutch booster 22. Spent fluid from the clutch booster is exhausted to reservoir 26'.

A second check valve 46 prevents the passage of fluid from the second clutch booster supply conduit 42 to the auxiliary supply conduit 50 but allows flow in the opposite direction depending on pressurization of second supply conduit 50.

Auxiliary supply conduit 50 is connected to the seat accumulator 54 via line 52. The seat accumulator is a conventional hydraulic accumulator that is charged in a well known manner when the pump 32 is actuated.

The second supply conduit 50 is interrupted by a ball check valve 44 that is mechanically connected to the clutch pedal linkage to be unseated when the clutch pedal is depressed to disengage the clutch. When the ball of the check valve is unseated and the second check valve sees greater pressure on the auxiliary supply conduit 50 side then on the second clutch booster supply conduit 42 the fluid will flow through the auxiliary supply conduit 50 to the clutch booster 22.

The seat accumulator 54 will be charged by the pump 32 through the second supply conduit 76 which provides fluid to a seat height adjustment valve 74 and seat ride control cylinder 60. Jumper conduit 72 connects the height adjustment valve 74 to the seat ride control cylinder 60 while the ride control cylinder is connected to an accumulator charging conduit 56.

The seat height adjustment valve 74 incorporates one-way ball check valves that allow hydraulic fluid to pass from the pump 32 to the accumulator 54 but prevent fluid flow from the accumulator to the pump 32 when the pump is not pumping.

Reservoir 26" is connected to the seat adjustment valve for the exhaust of unneeded extra fluid. An adjustment knob 70 is provided to adjust the ride characteristics of the seat 14.

In operation the clutch booster 22 will normally be supplied with fluid directly from the pump as long as the tractor is driving the pump. The first check valve 36 would open while the second check valve 46 would remain closed. The seat accumulator would be charged by the pump.

When the clutch booster is operated without the benefit of the pump, i.e., when the tractor is started up, fluid under pressure will be delivered from the alternative source of pressure—the seat accumulator—to the clutch booster 22.

The clutch pedal linkage will unseat the ball check valve 44 and the second check valve 46 will be opened. The first check valve 36 will remain seated. Fluid will not pass through the accumulator charging conduit 56 as the ball checks in the seat height adjustment valve will prevent this.

As the clutch booster 22 receives the fluid under pressure the operator can hold the tractor clutch disengaged while starting the tractor.

The seat accumulator will allow several clutch disengagements before the seat accumulator is exhausted but will be recharged soon after the tractor's hydraulic pump is operating.

Thus it can be seen that there has been provided a hydraulic seat accumulator that acts as a clutch booster when a primary source of fluid pressure is interrupted and the clutch pedal of the host vehicle is depressed. The inventor contemplates that minor revisions and nuances of engineering design could be incorporated into this disclosure. Such nuances and variations are contemplated to be within the spirit and scope of the appended claims.

What is claimed is:

1. In a vehicle having an operator accommodating seat and a hydraulic assisted clutch, the improvement comprising:
   a hydraulic seat suspension system having an accumulator for maintaining a supply of hydraulic fluid under pressure;
   a hydraulically assisted clutch booster including an operating pedal, said booster hydraulically communicating with said accumulator;
   a ball check valve normally closed between said accumulator and said clutch booster, said ball check valve mechanically operable to open upon displacement of said operating pedal whereby hydraulic fluid will flow from said accumulator to said clutch booster.

2. The invention in accordance with claim 1 wherein a primary source of fluid supplies said clutch booster preferentially before said accumulator fluid is dispensed.

3. The invention in accordance with claim 2 wherein a first check valve is located between said primary source of fluid supply and said clutch booster allowing flow only from said primary source of fluid;
   a second check valve located between said ball check valve and said clutch booster, said second check valve open only when said primary source of fluid is inoperative and said accumulator has sufficient pressure to unseat said second check valve when said clutch pedal is displaced and said ball check valve is open.

4. The invention in accordance with claim 3 wherein said primary source of fluid is an engine driven hydraulic pump.

5. The invention in accordance with claim 4 further incorporating a seat height adjustment valve hydraulically communicating with said primary source of fluid pressure and said accumulator, said seat height adjustment valve preventing fluid flow from said accumulator to said primary source of fluid when said primary source of fluid is inoperative.

6. The invention in accordance with claim 5 further incorporating a seat ride control cylinder hydraulically communicating with said seat height adjustment valve and said accumulator whereby ride characteristics of said operator accompanying seat are controlled.

7. In a tractor vehicle having a primary source of hydraulic fluid, a seat incorporating a hydraulic suspension and a pedal operated clutch booster, the improvement comprising:
   a hydraulic accumulator hydraulically associated with said hydraulic suspension of said seat;
   an auxiliary supply conduit connected to said hydraulic accumulator;
   a ball check valve for interrupting flow through said auxiliary conduit responsive to position of said pedal;
   a first check valve between said primary source of hydraulic fluid and said clutch booster;
   a second check valve between said ball check valve and said clutch booster, said second check valve open only when said primary source of fluid is inoperative and said hydraulic accumulator has sufficient pressure to unseat said second check valve when said clutch pedal is depressed and said ball check valve is open.

8. The invention in accordance with claim 7 wherein said hydraulic suspension incorporates a seat height adjustment valve having a plurality of ball check valves preventing fluid flow from said accumulator through said seat height adjustment valve when said primary source of fluid pressure is inoperative.

9. The invention in accordance with claim 8 wherein said first and said second check valves are spring loaded check valves.

* * * * *